United States Patent [19]

Sato et al.

[11] Patent Number: 4,933,830
[45] Date of Patent: Jun. 12, 1990

[54] SWITCHING POWER SUPPLY

[75] Inventors: Masayoshi Sato; Norikazu Tokunaga; Hisao Amano; Yasuo Matsuda, all of Hitachi, Japan

[73] Assignee: Hitachi, Ltd., Tokyo, Japan

[21] Appl. No.: 343,748

[22] Filed: Apr. 27, 1989

[30] Foreign Application Priority Data

Apr. 28, 1988 [JP] Japan .................... 63-103949

[51] Int. Cl.⁵ ............................ H02M 7/537
[52] U.S. Cl. ........................ 363/131; 363/20; 363/21; 219/10.55 B
[58] Field of Search ............ 363/20, 21, 131; 219/10.55 B; 336/184

[56] References Cited

U.S. PATENT DOCUMENTS

| | | | |
|---|---|---|---|
| 3,631,534 | 12/1971 | Hirota et al. | 336/184 |
| 3,886,434 | 5/1975 | Schreiner | 336/184 |
| 4,027,200 | 5/1977 | Sahara et al. | 363/20 |
| 4,079,295 | 3/1978 | den Hollander | 363/20 |
| 4,327,348 | 4/1982 | Hirayama | 336/184 |
| 4,628,426 | 12/1986 | Steigerwald | 363/21 |
| 4,675,796 | 6/1987 | Gautherin et al. | 363/20 |
| 4,774,649 | 9/1988 | Archer | 363/131 |

OTHER PUBLICATIONS

Sakoguchi et al.; "Computer Aided Design of Inverter Circuits for Magnetrons"; Sanyo Tech. Review, Feb. 1982, pp. 77-85.

*Primary Examiner*—Patrick R. Salce
*Assistant Examiner*—Jeff Sterrett
*Attorney, Agent, or Firm*—Antonelli, Terry, Stout & Kraus

[57] ABSTRACT

A switching power supply using a step-up transformer whose impedance viewed from its primary side is different from the impedance viewed from its secondary side whereby the inductance of its primary and secondary windings are settable independently of each other.

10 Claims, 5 Drawing Sheets

SWITCHING POWER SUPPLY

BACKGROUND OF THE INVENTION

The present invention relates to an improvement in a switching power supply, and more particularly to a high-frequency switching power supply suited to drive the magnetron for microwave ovens.

There has been well known a switching power supply provided with a step-up transformer, in which an input voltage is applied across a primary winding, and a high voltage developed across the secondary winding is supplied to a load, for example, a magnetron. In this power supply, a switching element such as a transistor is connected in series with the primary winding, and a resonating capacitor is connected in parallel to one of the primary winding, the secondary winding and the switching element. When the switching element repeats an ON-OFF operation at high speed, high-frequency oscillation is generated in, for example, a resonance circuit made up of the capacitor and the primary winding, and a high voltage is developed across the secondary winding.

An example of a switching power supply is disclosed in Sanyo Technical Review, Vol. 14, No. 1, Feb., 1982. In this switching power supply, the switching element is connected in series with the primary winding, and the resonating capacitor is connected in parallel to the switching element.

In such a switching power supply, a rectified voltage is applied to the primary winding of the step-up transformer in the ON-period of the switching element, and the energy stored in the primary winding in the ON-period is supplied to the resonance circuit made up of the capacitor and the primary winding, in the OFF-period of the switching element. Thus, a current flows through the primary winding in the OFF-period. Further, the output of a magnetron applied with a high voltage from the secondary winding is adjusted by changing the ON-period of the switching element, that is, the duty ratio of the anode current of the magnetron. In this case, the voltage applied across the switching element is required to become equal to zero in the OFF-period of the switching element. Hence, it is desirable to make small the inductance of the resonance circuit. If a large residual voltage exists, a large current due to the residual voltage will flow through the switching element, and there will be a fear of damaging the switching element.

The voltage waveform, which is applied across the switching element in the OFF-period thereof, is determined by the electric constants of the primary winding of the step-up transformer, the resonating capacitor connected in parallel to the primary winding or the switching element, and a high-tension capacitor provided on the secondary side. In general, the inductance value of the primary circuit of the step-up transformer is appropriately set to obtain a favorable oscillating waveform. This is because sufficient magnetic energy has to be stored in the ON-period of the switching element by the inductance of the step-up transformer, and the inductance of the step-up transformer is required to be greater than a predetermined value.

Further, unless the peak value of the anode current of the magnetron is made less than a predetermined value, for example, 1.2 A, moding may occur so that an excessively high voltage is generated in the magnetron. In order to prevent the generation of such an unordinary voltage, the primary or secondary circuit of the step-up transformer is required to have the inductance of an appropriate magnitude. Thus, it is necessary to determine the inductance values of the primary and secondary circuits in accordance with the above objects and independently of each other.

In general, the primary inductance $L_{01}$ of a transformer at a time the secondary side is made open, that is, the inductance $L_{01}$ viewed from the primary side is nearly equal to the reduced or converted secondary inductance $L_{02}$ which is obtained by converting the secondary inductance $L_2$ of the transformer at a time the primary side is made open (that is, the inductance viewed from the secondary side) into an inductance value on the primary side. That is, $L_{01} = L_{02} = a^2 L_2$ where a indicates a transformation ratio (namely, turn ratio). In view of the above fact, it has been proposed to insert a reactor in one of the primary and secondary circuits for the purpose of adjusting the inductance values of these circuits independently of each other. In this case, however, a switching power supply becomes, as a whole, large in size, and the manufacturing cost thereof is increased.

SUMMARY OF THE INVENTION

It is an object of the present invention to provide a switching power supply, in which the inductance values of the primary and secondary circuits of a step-up transformer can be set independently of each other without inserting a reactor in one of the primary and secondary circuits.

In order to attain the above object, a switching power supply according to the present invention employs a step-up transformer, in which the reduced or converted secondary inductance $L_{02}$ obtained by converting the inductance $L_2$ viewed from the secondary side into an inductance value on the primary side, is made different from the inductance $L_{01}$ viewed from the primary side. The inductance $L_{01}$ viewed from the primary side is measured by passing a current through the primary circuit in a state that the secondary side is made open, and the inductance $L_2$ viewed from the secondary side is measured by passing a current through the secondary circuit in a state that the primary side is made open. The reduced or converted secondary inductance $L_{02}$ corresponding to the inductance $L_2$ viewed from the secondary side is the product of the inductance $L_2$ and $a^2$, where a indicates the turn ratio of the transformer. For example, the inductance $L_{01}$ viewed from the primary side is selected to be in a range from 60 to 100 $\mu$H and preferably set to 80 $\mu$H. While, the inductance $L_2$ viewed from the secondary side is selected to be in a range from 18 to 30 mH, and preferably set to 24 mH. Incidentally, in a conventional transformer having a turn ratio of 1/20, the inductance $L_{01}$ and the inductance $L_2$ are 80 $\mu$H and 32 mH, respectively.

The reduced or converted secondary inductance $L_{02}$ can be made different from the inductance $L_{01}$ by various methods. For example, the primary winding (or secondary winding) is wound around both legs of an iron core having two legs and the secondary winding (or primary winding) is wound around only one of two legs, to make the reduced or converted inductance $L_{02}$ different from the inductance $L_{01}$.

Alternatively, the primary and secondary windings may be wound around one leg of an iron core having three legs so that only a portion of one of the primary and secondary windings overlap the remaining winding.

By using the above methods, the magnetic coupling between a portion of one of the primary and secondary windings and the other winding is made close or tight, and the magnetic coupling between the remaining portion of one winding and the other winding is made loose. Thus, the inductance of the primary winding and the inductance of the secondary winding can be set independently of each other.

DESCRIPTION OF THE PREFERRED EMBODIMENT

Figure 1:
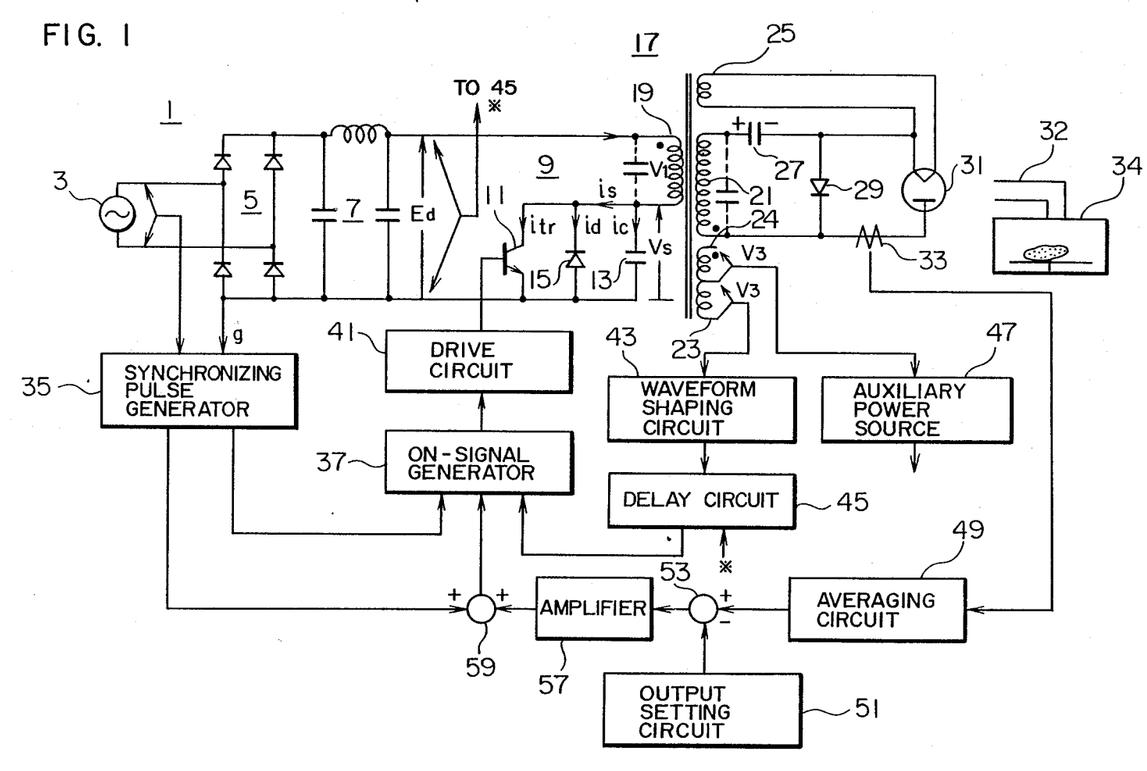
FIG. 1 is a circuit diagram showing an embodiment of a switching power supply according to the present invention.

FIG. 1 shows an embodiment of a switching power supply according to the present invention. Referring to FIG. 1, a D.C. source 1 for supplying D.C. power to a switching power supply is made up of a commercial A.C. source 3 and a full-wave rectifier 5. The D.C. source 1 may be a battery. The D.C. output terminals of the rectifier 5 are connected to the input terminals of a low-pass filter 7 made up of a reactor and capacitors. The filter 7 does not smooth the output voltage of the rectifier 5 (that is, rectified voltage), but prevents the frequency components higher than the voice frequencies included in the oscillating current mentioned later, from leaking out through the A.C. source, to suppress the generation of radio noise.

The cut-off frequency of the filter 7 is made higher than the voice frequency range or 20 KHz. Hence, the filter 7 has no effect on the operation of the switching device 9. Further, since circuit constants of the filter 7 are selected so that the filter 7 has the above frequency characteristic, the filter 7 does not have a function of smoothing the output voltage of the rectifier 5.

The switching device 9 includes a transistor 11 which repeats an ON-OFF operation as will be mentioned later, and a damper diode 15 which is connected in antiparallel to the transistor 11. A resonating capacitor 13 is connected in parallel to each of the transistor 11 and the capacitor 15. A step-up transformer 17 has a primary winding 19 and secondary windings 21, 23, 24 and 25. The primary winding 19 is connected to the filter 7 through the switching device 9, and a series resonance circuit is made up of the capacitor 13 and the primary winding 19. The secondary winding 21 is connected to a magnetron 31 through a voltage multiplying rectifier made up of a capacitor 27 and a high-tension diode 29. The high-frequency wave generated by the magnetron 31 is introduced into a heating device 34 through a wave guide 32. A current detector 33 detects a load current flowing through the magnetron 31.

The secondary winding 25 is used for heating the cathode of the magnetron 31, and the secondary winding 23 is used for obtaining an output voltage of the step-up transformer 17 by detecting the flux change in its core.

Figure 2:
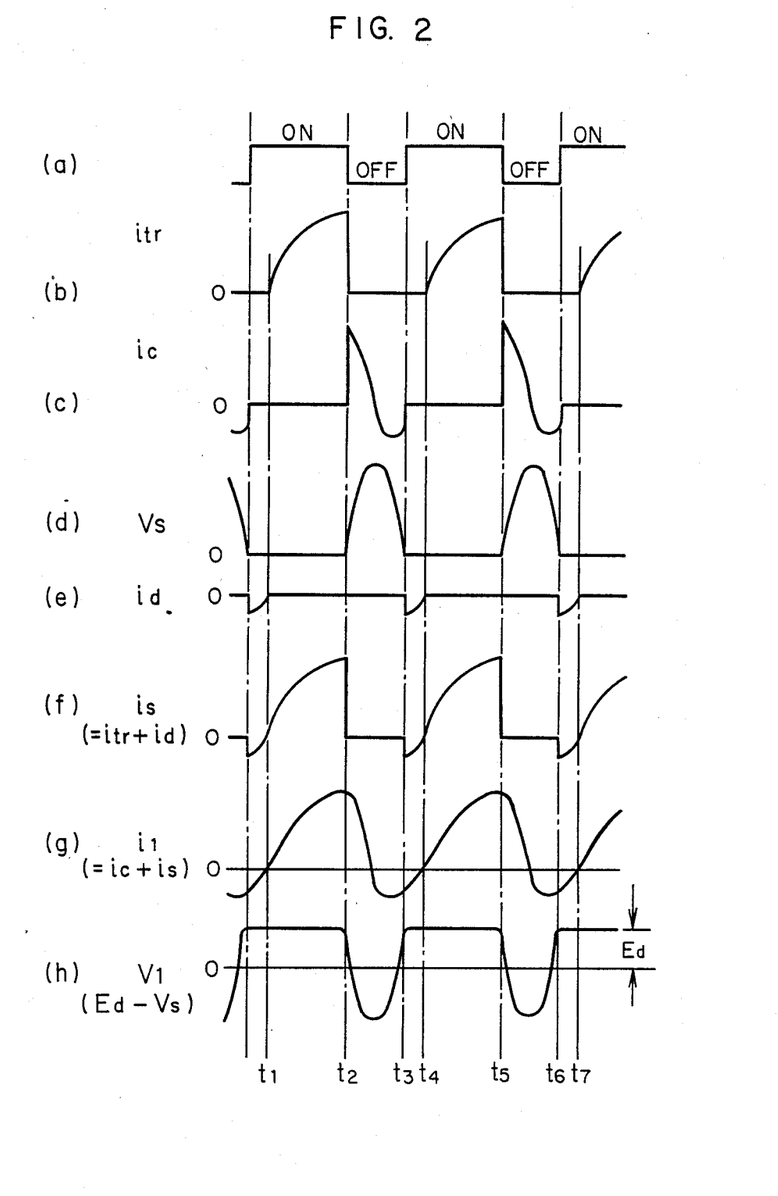
FIGS. 2 to 4 are waveform charts showing signal waveforms at various parts of the embodiment of FIG. 1.

The transistor 11 repeats an ON-OFF operation in accordance with the base signal shown in FIG. 2(a).

When the base signal is applied to the base of the transistor 11, a collector current $I_{tr}$ begins to flow through the transistor 11 at a time $t_1$, as shown in FIG. 2(b). Thus, energy is stored in the primary coil 19. When the transistor 11 is turned off at a time $t_2$, oscillation is started in the resonance circuit, and the energy stored in the primary winding 19 is transferred to the capacitor 13. As a result, a current $I_c$ flows through the capacitor 13, as shown in FIG. 2(c). Hence, a voltage $V_s$ appearing across the capacitor 13, that is, a voltage developed across the switching device 9 begins to increase from zero, as shown in FIG. 2(d).

When the current $I_c$ becomes equal to zero, the voltage $V_s$ reaches a peak value. Then, the voltage $V_s$ decreases, and becomes equal to zero at a time $t_3$. At the same time as the voltage $V_s$ becomes equal to zero, the transistor 11 is again turned on. At this time, a portion of the oscillating current $I_c$ flows through the damper diode 15, as indicated by a current $I_d$ in FIG. 2(e). When the current $I_d$ becomes equal to zero at a time $t_4$, the current $I_{tr}$ again begins to flow through the transistor 11, as shown in FIG. 2(b).

The above-mentioned operation is repeated. Thus, the combined current $I_s$ of the current $I_{tr}$ and the current $I_d$ flows through the switching device 9 as shown in FIG. 2(f), and the sum current $I_l$ of the current $I_c$ and the current $I_s$ flows through the primary winding 19 as shown in FIG. 2(g). Accordingly, a voltage $V_l$ equal to the difference between the output voltage $E_d$ of the filter 7 and the voltage $V_s$ is applied across the primary winding 19 as shown in FIG. 2(h).

As can be seen from FIG. 2(g), the current $I_l$ brings about a flux change in the core of the step-up transformer 17, and generates a high voltage across the secondary winding 21 in accordance with the turn ratio between the primary winding 19 and the secondary winding 21. Further, a synchronizing pulse generator 35 receives the A.C. source voltage from the commercial A.C. source 3, to generate a synchronizing pulse at a time the A.C. source voltage becomes equal to zero. The synchronizing pulse generator 35 further generates a signal having an instantaneous value proportional to that of the A.C. source voltage. The synchronizing pulse from the synchronizing pulse generator is applied to an ON-signal generator 37 which generates an ON-signal for making the transistor 11 conductive. The ON-signal is applied to the base of the transistor 11 through a drive circuit 41.

Further, a voltage $v_3$ appearing across the secondary winding 23 is applied to a waveform shaping circuit 43, to be converted into a first signal. The first signal from the shaping circuit 43 is applied to a delay circuit 45. Thus, the first signal is delayed by a time interval determined by a signal applied thereto and proportional to the voltage $E_d$, and the delayed signal is sent out, as a second signal, from the delay circuit 45. The second signal is applied, as an input signal, to the ON-signal generator 37.

An averaging circuit 49 makes smooth the output of the current detector 33 to obtain an output signal proportional to the load current, that is, the anode current of the magnetron 31. The output signal of the averaging circuit 49 is applied to a comparator 53, to be compared with an output target value set by an output setting device 51. Thus, the difference between the output of the averaging circuit 49 and the output target value set by the output setting device 51 is sent out from the comparator 53, to be applied to an adder 59 through an amplifier 57. The adder 59 adds the output of the amplifier 57 to the signal which is sent out from the synchronizing pulse generator 35 and is proportional to the instantaneous value of the A.C. source voltage. The output of the adder 59 is applied, as an input signal, to the ON-signal generator 37. The voltage $V_3$ appearing across the secondary winding 24 similar to the secondary winding 23 is rectified and smoothed by an auxiliary power source 47. The output of the auxiliary power source 47 is used as a source voltage $V_{cc}$ for operating various circuits mentioned above.

Figure 3:
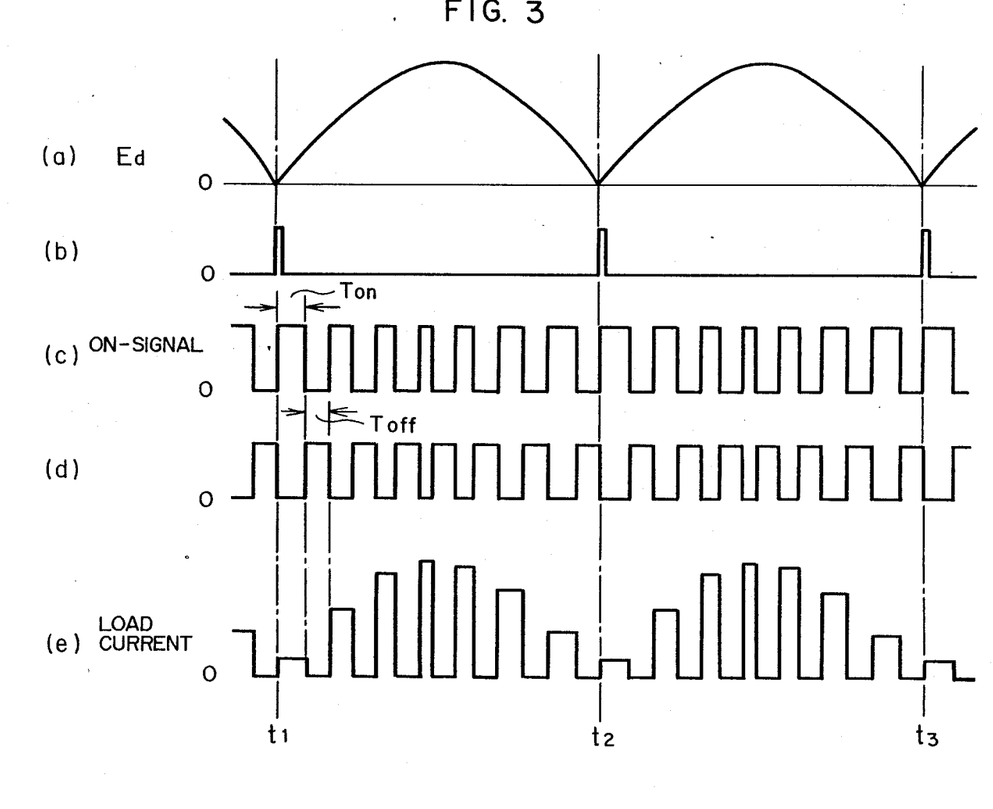

As has been already explained, the filter 7 does not have a function of smoothing the rectified voltage. Hence, as shown in FIG. 3(a), the waveform of the output voltage $E_d$ from the filter 7 is substantially the same as the waveform of an ordinary full-wave rectified voltage. As shown in FIG. 3(b), the synchronizing signal generator 35 generates a synchronizing signal at a time the A.C. source voltage becomes equal to zero. The ON-signal generator 37 generates the ON-signal, as shown in FIG. 3(c). In more detail, the first ON-pulse at the beginning of each cycle of the ripple voltage $E_d$ corresponding to the half-cycle of the A.C. source voltage, is generated in synchronism with the synchronizing signal, as shown in FIG. 3(c). ON-pulses following the first ON-pulse are generated in synchronism with each falling edge of the output of the delay circuit 45, as shown in FIG. 3(d). The duration time of each of the ON-pulses thus obtained is determined by the output of the adder 59, and the width of each ON-pulse decreases as the instantaneous value of the ripple voltage $E_d$ is larger. Thus, the magnetic saturation of the iron core of the transformer 17 can be prevented. The ON-signal which is generated in the above-mentioned manner, is applied to the transistor 11 through the drive circuit 41, to supply a base current to the transistor 11. The transistor 11 performs an ON-OFF operation in accordance with the base current. As a result, a high voltage is developed across the secondary winding 21, and a load current shown in FIG. 3(e) flows through the magnetron 31. FIG. 3(e) shows the load current which flows through the magnetron 31 in an ordinary state. As can be seen from FIG. 3(e), the output of the magnetron 31 is adjusted by controlling the duty ratio of the ON-OFF operation of the transistor 11, that is, a ratio of the ON-period $T_{on}$ to one cycle period of the ON-OFF operation (namely, the sum of the ON-period $T_{on}$ and the OFF-period $T_{off}$).

In the present embodiment, the ON-period $T_{on}$ is changed but the OFF-period $T_{off}$ is kept constant. This is because the oscillating current $I_c$ flows during the OFF-period as shown in FIG. 2(c) and a resonating period is determined by the electric constants of the capacitor 13 and the primary winding 19.

Figure 4:
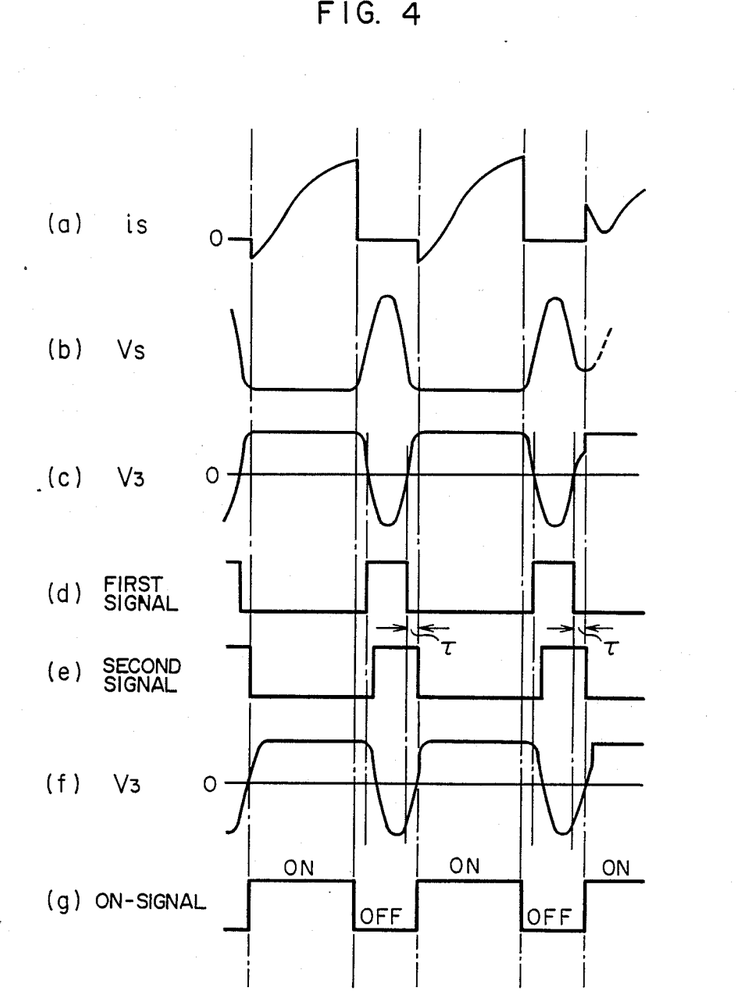

FIGS. 4(a) and 4(b) show the current $I_s$ and the voltage $V_s$ for the switching device 9, and correspond to FIGS. 2(f) and 2(d), respectively. FIG. 4(c) shows the waveform of the voltage $V_3$ appearing across the secondary winding 23. The voltage $V_3$ is similar to the voltage $V_l$ shown in FIG. 2(h). The voltage $V_3$ generated on the basis of the voltage $V_l$ is sliced at a threshold level equal to zero by the waveform shaping circuit 43, to generate the first signal in a period when the voltage $V_l$ has a negative value. That is, the first signal is generated as shown in FIG. 4(d). As is apparent from the comparison of FIG. 4(b) with FIG. 4(d), a time the voltage $V_s$ becomes equal to zero, is different from the falling edge of the first signal. When the first signal is so delayed as to obtain the second signal shown in FIG. 4(e), the falling edge of the second signal agrees with a time the voltage $V_s$ becomes equal to zero. The delay circuit 45 delays the first signal as mentioned above. As can be seen from the above, the delay time due to the delay circuit 43 is dependent on the threshold level for slicing the voltage $V_3$, and is determined in accordance with the threshold level. The ON-signal generator 37 generates an ON-pulse in synchronism with each falling edge of the second signal, as shown in FIG. 4(g). That is, each leading edge of the ON-signal agrees with a time the voltage $V_s$ becomes equal to zero. Even when the oscillation becomes unstable and thus the voltage $V_s$ is not reduced to zero, or the current $I_d$ does not flow, the ON-signal can be surely generated on the basis of the second signal. Further, the second signal shown in FIG. 4(e) can also be formed, in such a manner that the arrangement order of the waveform shaping circuit 43 and the delay circuit 45 is reversed. That is, the voltage $V_3$ appearing across the secondary winding 23 is first delayed by the delay circuit 45 as shown in FIG. 4(f), and then shaped by the shaping circuit 43 to form the second signal shown in FIG. 4(e). Further, the ON-signal shown in FIG. 4(g) can be obtained directly from the delayed voltage $V_3$ shown in FIG. 4(f). In this case, the ON-signal generator 37 is triggered at a time the delayed voltage $V_3$ changes from a negative value to a positive value.

As mentioned above, the flux change in the iron core of the transformer 17 is detected by the voltage $V_3$ appearing across the secondary winding 23, and the ON-signal for the transistor 11 is generated on the basis of the voltage $V_3$. As is apparent from FIGS. 2(h) and 4(c), the voltage $V_l$ appearing across the primary winding 19 is equal in waveform to the voltage $V_3$ induced across the secondary winding 23. Hence, the leading edge of each ON-pulse can be indicated by the voltage $V_l$, that is, the ON-signal can be formed on the basis of the voltage $V_l$. Thus, the secondary winding 23 can be eliminated, and the transformer 17 can be made small in size. In this case, however, the secondary winding 24 is also eliminated, since the secondary winding 23 and the secondary winding 24 is united in one body. Thus, it is required to provide an independent power source for driving various circuits. It is judged from the state of things which of the transformer having the secondary windings 23 and 24 and a transformer devoid of the secondary windings 23 and 24 is employed.

Figure 5:
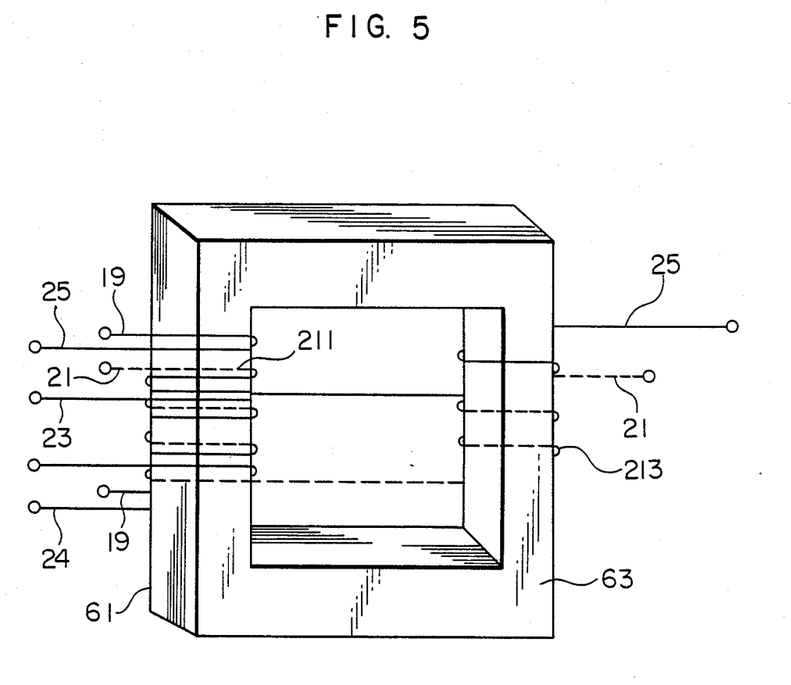
FIG. 5 is an explanatory view showing the arrangement of windings in the step-up transformer of FIG. 1.

FIG. 5 shows the arrangement of windings in the step-up transformer 17. Referring to FIG. 5, the step-up transformer 17 is a core-type transformer having two legs 61 and 63. The primary winding 19 is wound around the leg 61. While, a portion 211 of the secondary winding 21 is wound around the leg 61, and the remaining portion 213 of the secondary winding 21 is wound around the leg 63. Accordingly, the magnetic coupling between the portion 211 and the primary winding 19 is close or tight, and the magnetic coupling between the portion 213 and the primary winding 19 is loose. Thus, the secondary inductance can be set independently of the primary inductance. The ratio of the secondary inductance to the primary inductance can be adjusted by changing the ratio of the portion 211 to the portion 213. Further, the sum of the primary inductance and the secondary inductance can be set to a desired value by changing the length of the legs 61 and 63 or the distance between the legs 61 and 63. Hence, each of the primary inductance and secondary inductance of the step-up transformer 17 can be set to a desired value, and a switching power supply including the above step-up transformer can perform a stable operation without using a reactor. Incidentally, the secondary winding 25 for heating the filament of the magnetron 31 is wound around each of the legs 61 and 63, and the secondary winding 23 for generating a timing signal and the secondary winding 24 for the auxiliary power source are wound around the leg 61.

In the present embodiment, as shown in FIG. 5, the secondary winding 21 is divided into two portions 211 and 213. Alternatively, the primary winding 19 may be divided into two portions. Further, the primary winding 19 and the secondary winding 21 may be wound around the same leg so that a portion of the primary winding 19 and a portion of the secondary winding 21 overlap each other. In this case, the magnetic coupling between the primary winding 19 and the overlapping portion of the secondary winding 21 is close or tight, but the magnetic coupling between the primary winding 19 and the remaining portion of the secondary winding 21 is loose. Hence, the primary inductance and the secondary inductance can be set independently of each other without using a reactor.

In order to prevent the microwave generated at the anode of the magnetron 31 from leaking from the filament thereof, filament terminals are connected to a filter made of a reactor and a capacitor, though the filter is not shown in FIG. 1. As mentioned above, the output of the magnetron 31 is controlled by changing the ON-period for the transistor 11. When the ON-period is changed, the frequency of the output voltage of the secondary winding 25 for heating the filament is changed. A change in frequency of the above output voltage produces an effect on the impedance of the filter connected to the filament, and thus a filament current is varied. In addition, variations in output voltage of the secondary winding 25 due to changes in inductance of the transformer 17 result in variation of the filament current. Although the filament current varies as above, the filament temperature is required to lie within a predetermined range. In the transformer of FIG. 5, like the secondary winding 21, the secondary winding 25 is divided into two portions, one of which is wound around the leg 61 and the other portion is wound around the leg 63. That is, in the present embodiment, the magnetic coupling between the secondary winding 21 and the secondary winding 25 is made close or tight to stabilize the filament temperature.

In the present embodiment, the resonating capacitor 13 is connected in parallel to the transistor 11. Alternatively, the capacitor 13 may be connected in parallel to the primary winding 19 or the secondary winding 21, as indicated by dotted lines in FIG. 1.

As has been explained in the foregoing, according to the present invention, it is not required to provide a reactor on the primary or secondary side of a step-up transformer. Thus, a switching power supply including a step-up transformer can be made small in size.

We claim:

1. A switching power supply comprising:
    a D.C. power source;
    a step-up transformer having a primary winding and a secondary winding, the primary winding being supplied with electric power from the D.C. power source, the secondary winding being connected to a load, an inductance value of the transformer viewed from the primary side being different from a converted secondary inductance value of the transformer, the converted secondary inductance value being obtained by converting an inductance value of the transformer viewed from the secondary side into an inductance value on the primary side;
    a switching element connected in series with the primary winding for repeating an ON-OFF operation in accordance with a control signal;
    a capacitor connected in parallel with at least one of the switching element, the primary winding and the secondary winding, for forming an oscillation circuit in cooperation with one of the primary and secondary windings; and
    a control device for periodically generating an ON-pulse which makes the switching element conductive for a predetermined period, to supply a series of ON-pulses to the switching element, the ON-pulse being applied as the control signal to the switching element.

2. A switching power supply comprising:
    a D.C. power source;
    a step-up transformer having a primary winding and a secondary winding, the primary winding being supplied with electric power from the D.C. power source, the secondary winding being connected to a load, and inductance value of the transformer viewed from the primary side being different from a product of $a^2$ and an inductance value of the transformer viewed from the secondary side, where a indicates a turn ratio;
    a switching element connected in series with the primary winding for repeating an ON-OFF operation in accordance with a control signal;
    a capacitor connected in parallel to at least one of the switching element, the primary winding and the secondary winding, for forming an oscillation circuit in cooperation with one of the primary and secondary windings; and
    a control device for periodically generating an ON-pulse which makes the switching element conductive for a predetermined period, to supply a series of ON-pulses to the switching element, the ON-pulses being applied as the control signal to the switching element.

3. A switching power supply for driving a magnetron, comprising:
    a D.C. power source;
    a step-up transformer having an iron core, a primary winding and a secondary winding, the primary winding being supplied with electric power from the D.C. power source, the secondary winding being connected to the magnetron the iron core having two legs, the secondary winding being wound around each of two legs, the primary winding being wound around only one of two legs;
    a switching element connected in series with the primary winding for repeating an ON-OFF operation in accordance with a control signal;
    a capacitor connected in parallel to at least one of the switching element, the primary winding and the secondary winding, for forming an oscillation circuit in cooperation with one of the primary and secondary windings; and
    a control device for periodically generating an ON-pulse which makes the switching element conductive for a predetermined period, to supply a series of ON-pulses to the switching element, the ON-pulses being applied as the control signal to the switching element.

4. A switching power supply comprising:
a D.C. power source;
a step-up transformer having a primary winding and a secondary winding, the primary winding being supplied with electric power from the D.C. power source, the secondary winding being connected to a load, an inductance value of the transformer viewed from the primary side being different from a converted secondary inductance value of the transformer, the converted secondary inductance value being obtained by converting an inductance value of the transformer viewed from the secondary side into an inductance value on the primary side;
a switching element connected in series with the primary winding for repeating an ON-OFF operation in accordance with a control signal;
a capacitor connected in parallel with the switching element for forming an oscillation circuit in cooperation with the primary winding; and
a control device for periodically generating an ON-pulse which makes the switching element conductive for a predetermined period, to supply a series of ON-pulses to the switching element, the ON-pulses being applied as the control signal to the switching element.

5. A switching power supply comprising:
a D.C. power source;
a step-up transformer having a primary winding and a secondary winding, the primary winding being supplied with electric power from the D.C. power source, the secondary winding being connected to a load, one of the primary and secondary windings being divided with first and second portions, the magnetic coupling between the first portion and the other winding being made close, the magnetic coupling between the second portion and the other winding being made loose;
a switching element connected in series with the primary winding for repeating an ON-OFF operation in accordance with a control signal;
a capacitor connected in parallel to the switching element for forming an oscillation circuit in cooperation with the primary winding; and
a control device for periodically generating an ON-pulse which makes the switching element conductive for a predetermined period, to supply a series of ON-pulses to the switching element, the ON-pulses being applied as the control signal to the switching element.

6. A switching power supply for driving a magnetron comprising:
a D.C. power source;
a step-up transformer having a primary winding and a secondary winding, the primary winding being supplied with electric power from the D.C. power source, the secondary winding being connected to the magnetron, an inductance value of the transformer viewed from the primary side being different from a converted secondary inductance value of the transformer, the converted secondary inductance value being obtained by converting an inductance value of the transformer viewed from the secondary side into an inductance value on the primary side;
a switching element connected in series with the primary winding for repeating an ON-OFF operation in accordance with a control signal;
a capacitor connected in parallel to the switching element for forming an oscillation circuit in cooperation with the primary winding; and
a control device for periodically generating an ON-pulse which makes the switching element conductive for a predetermined period, to supply a series of ON-pulses to the switching element, the ON-pulses being applied as the control signal to the switching element.

7. A switching power supply for driving a magnetron, comprising:
a D.C. power source;
a step-up transformer having an iron core, a primary winding and a secondary winding, the primary winding being supplied with electric power from the D.C. power source, the secondary winding being connected to the magnetron, the iron core having two legs, the secondary winding being wound around each of two legs, the primary winding being wound around only one of two legs;
a switching element connected in series with the primary winding for repeating an ON-OFF operation in accordance with a control signal;
a capacitor connected in parallel to the switching element for forming an oscillation circuit in cooperation with the primary winding; and
a control device for periodically generating an ON-pulse which makes the switching element conductive for a predetermined period, to supply a series of ON-pulses to the switching element, the ON-pulses being applied as the control signal to the switching element.

8. A microwave oven range comprising:
rectifier means for obtaining a D.C. voltage by rectifying a commercial A.C. voltage;
a magnetron for supplying microwave power to a microwave heating device;
a step-up transformer having a primary winding and a secondary winding, the primary winding being supplied with electric power from the rectifier means, the secondary winding being connected to the magnetron, an inductance value of the transformer viewed from the primary wide being different from a converted secondary inductance value of the transformer, the converted secondary inductance value being obtained by converting an inductance value of the transformer viewed from the secondary side into an inductance value on the primary side;
a switching element connected in series with the primary winding for repeating an ON-OFF operation in accordance with a control signal;
a capacitor connected in parallel to at least one of the switching element, the primary winding and the secondary winding, for forming an oscillation circuit in cooperation with one of the primary and secondary windings; and
a control device for periodically generating an ON-pulse which makes the switching element conductive for a predetermined period, to supply a series of ON-pulses to the switching element, the ON-pulse being applied as the control signal to the switching element.

9. A high-voltage switching power supply comprising:

a D.C. power source;

a step-up transformer having a primary winding and a pair of secondary windings connected in series to each other, one of the secondary windings being loosely coupled to the primary winding and the other secondary winding being tightly coupled to the primary winding, the primary winding being supplied with electric power from the D.C. power source, the secondary windings being connected to a load, an inductance value of the transformer viewed from the primary side when measured in a state that the secondary side of the transformer is open being different from a converted secondary inductance value of the transformer, the converted secondary inductance value being obtained by converting an inductance value of the transformer viewed from the secondary side when measured in a state that the primary side of the transformer is open into an inductance value on the primary side;

a switching element connected in series with the primary winding for repeating an ON-OFF operation in accordance with a control signal;

a capacitor connected in parallel with at least one of the switching element, the primary winding and the secondary winding, for forming an oscillation circuit in cooperation with one of the primary and secondary windings; and a control device for periodically generating an ON-pulse which makes the switching element conductive for a predetermined period, to supply a series of ON-pulses to the switching element, the ON-pulses being applied as the control signal to the switching element.

10. A high-voltage switching power supply comprising:

a D.C. power source;

a step-up transformer having a pair of primary windings connected in series to each other and a secondary winding, one of the primary windings being loosely coupled to the secondary winding and the other primary winding being tightly coupled to the secondary winding, the primary winding being supplied with electric power from the D.C. power source, the secondary windings being connected to a load, an inductance value of the transformer viewed from the primary side when measured in a state that the secondary side of the transformer is open being different from a converted secondary inductance of the transformer, the converted secondary inductance value being obtained by converting an inductance value of the transformer viewed from the secondary side when measured in a state that the primary side of the transformer is open, into an inductance value on the primary side;

a switching element connected in series with the primary winding for repeating an ON-OFF operation in accordance with a control signal;

a capacitor connected in parallel with at least one of the switching element, the primary winding and the secondary winding, for forming an oscillation circuit in cooperation with one of the primary and second windings; and a control device for periodically generating an ON-pulse which makes the switching element conductive for a predetermined period, to supply a series of ON-pulses to the switching element, the ON-pulses being applied as the control signal to the switching element.

* * * * *